(12) United States Patent
Dolker

(10) Patent No.: US 7,069,904 B2
(45) Date of Patent: Jul. 4, 2006

(54) METHOD FOR REGULATING THE SPEED OF AN INTERNAL COMBUSTION ENGINE

(75) Inventor: Armin Dolker, Immenstaad (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 0 days.

(21) Appl. No.: 10/533,845

(22) PCT Filed: Nov. 15, 2003

(86) PCT No.: PCT/EP03/12786

§ 371 (c)(1),
(2), (4) Date: May 4, 2005

(87) PCT Pub. No.: WO2004/046527

PCT Pub. Date: Jun. 3, 2004

(65) Prior Publication Data

US 2006/0011167 A1    Jan. 19, 2006

(30) Foreign Application Priority Data

Nov. 19, 2002  (DE) ............................. 102 53 739

(51) Int. Cl.
*F02D 31/00* (2006.01)
*G06F 19/00* (2006.01)
(52) U.S. Cl. ...................... 123/352; 701/110
(58) Field of Classification Search .................. 702/96, 702/142, 145, 147, 182, 190; 123/350, 352, 123/357, 436; 701/104, 105, 110, 111; 180/170, 180/178, 179; 73/493, 494, 117.3, 514.16
See application file for complete search history.

(56) References Cited

U.S. PATENT DOCUMENTS

| | | | |
|---|---|---|---|
| 4,248,321 A * | 2/1981 | Collonia .................... 180/179 |
| 4,495,913 A * | 1/1985 | Gray ......................... 123/352 |
| 4,715,339 A | 12/1987 | Sagawa et al. ............. 123/357 |
| 5,235,512 A * | 8/1993 | Winkelman et al. ........ 123/352 |
| 6,196,189 B1 * | 3/2001 | Baldwin et al. ............ 123/352 |
| 6,311,670 B1 * | 11/2001 | Constancis ................. 123/352 |
| 6,807,939 B1 | 10/2004 | Doelker et al. ............. 123/308 |
| 6,873,941 B1 | 3/2005 | Doelker ..................... 702/190 |
| 2005/0183700 A1 * | 8/2005 | Dolker ....................... 123/357 |
| 2005/0224047 A1 * | 10/2005 | Doelker ..................... 123/352 |

FOREIGN PATENT DOCUMENTS

| | | |
|---|---|---|
| DE | 0 059 585 B1 | 9/1982 |
| DE | 198 33 839 A1 | 2/2000 |
| DE | 199 53 767 A1 | 5/2001 |
| DE | 101 22 517 C1 | 6/2002 |

* cited by examiner

Primary Examiner—Willis R. Wolfe, Jr.
(74) Attorney, Agent, or Firm—Wolff & Samson PC; Klaus P. Stoffel

(57) ABSTRACT

A method for regulating the speed of an internal combustion engine. According to the invention, a second regulation difference (dR2) is calculated by a second filter in the event of dynamic changes of state. In this way, in the event of dynamic changes of state, a speed regulator defines a power-determining signal (ve) according to a first regulation difference (dR1) and the second regulation difference (dR2). The inventive method thus increases the dynamics of the control loop.

10 Claims, 4 Drawing Sheets

METHOD FOR REGULATING THE SPEED OF AN INTERNAL COMBUSTION ENGINE

PRIORITY CLAIM

This is a 35 U.S.C. §371 National Stage of International Application No. PCT/EP2003/012786, filed on Nov. 15, 2003. Priority is claimed on that application and on the following application:
Country: Germany, Application No. 102 53 739.9, Filed: Nov. 19, 2002.

BACKGROUND OF THE INVENTION

The invention concerns a method for the closed-loop speed control of an internal combustion engine.

The speed of a drive unit is typically automatically controlled to an idling speed and a final speed. A drive unit is understood to mean either an internal combustion engine-transmission unit or an internal combustion engine-generator unit. To achieve closed-loop speed control, the speed of the crankshaft is detected as a controlled value and compared with an engine speed set value, i.e., the reference input. The resulting control deviation is converted by a speed controller to a correcting variable for the internal combustion engine, for example, an injection quantity. The problem with a control loop of this type is that torsional oscillations, which are superimposed on the controlled value, can be amplified by the speed controller. This can lead to instability of the closed-loop control system The problem of instability is countered by a speed filter in the feedback path of the closed-loop speed control system. EP 0 059 585 B1 describes a speed filter of this type, in which the timing values of a shaft teeth are detected by means of an operating cycle of the internal combustion engine. The operating cycle is defined as two revolutions of the crankshaft, corresponding to 720°. These tooth timing values are then used to calculate a filtered tooth timing value by taking the arithmetic mean. This filtered tooth timing value corresponds to the filtered actual speed value, which is then used for the automatic control of the internal combustion engine.

A closed-loop speed control system for automatically controlling a drive unit with a speed filter of this type in the feedback path is described, for example, in DE 199 53 767 C2.

However, the problem with this two-revolution filter in the feedback path is that stable behavior of the drive unit is accompanied by deterioration of the design load behavior.

SUMMARY OF THE INVENTION

The goal of the invention is to optimize the closed-loop speed control system with respect to design load behavior.

In accordance with the invention, a second filter is used to compute a second filtered actual speed from the actual speed of the internal combustion engine, and then a second control deviation is computed from this second filtered actual speed. In the event of a dynamic change of state, the speed controller computes a power-determining signal, for example, an injection quantity, from the first and second control deviations. In this regard, the power-determining signal in the event of a dynamic change of state is substantially determined from the second control deviation.

A dynamic change of state occurs when a large deviation between set and actual speed values is present, for example, when a load application or load rejection occurs. The second filter is realized, e.g., as a mean value filter with a filter angle of 90°, for fast detection of this dynamic event. Compared to the two-revolution filter, a filtered speed value is present at a significantly earlier point in time, i.e., the dynamic change of state is detected faster.

The invention offers the advantage that couplings with a low natural frequency can be used. Since the second filter constitutes a pure software solution, it can be subsequently integrated in already existing engine control software.

When a dynamic change of state occurs, the second control deviation acts on a proportional component (P component) or a DT1 component of the speed controller. Suitable characteristic curves are provided for this purpose.

Preferred embodiments of the invention are illustrated in the drawings.

DETAILED DESCRIPTION OF THE INVENTION

Figure 1:
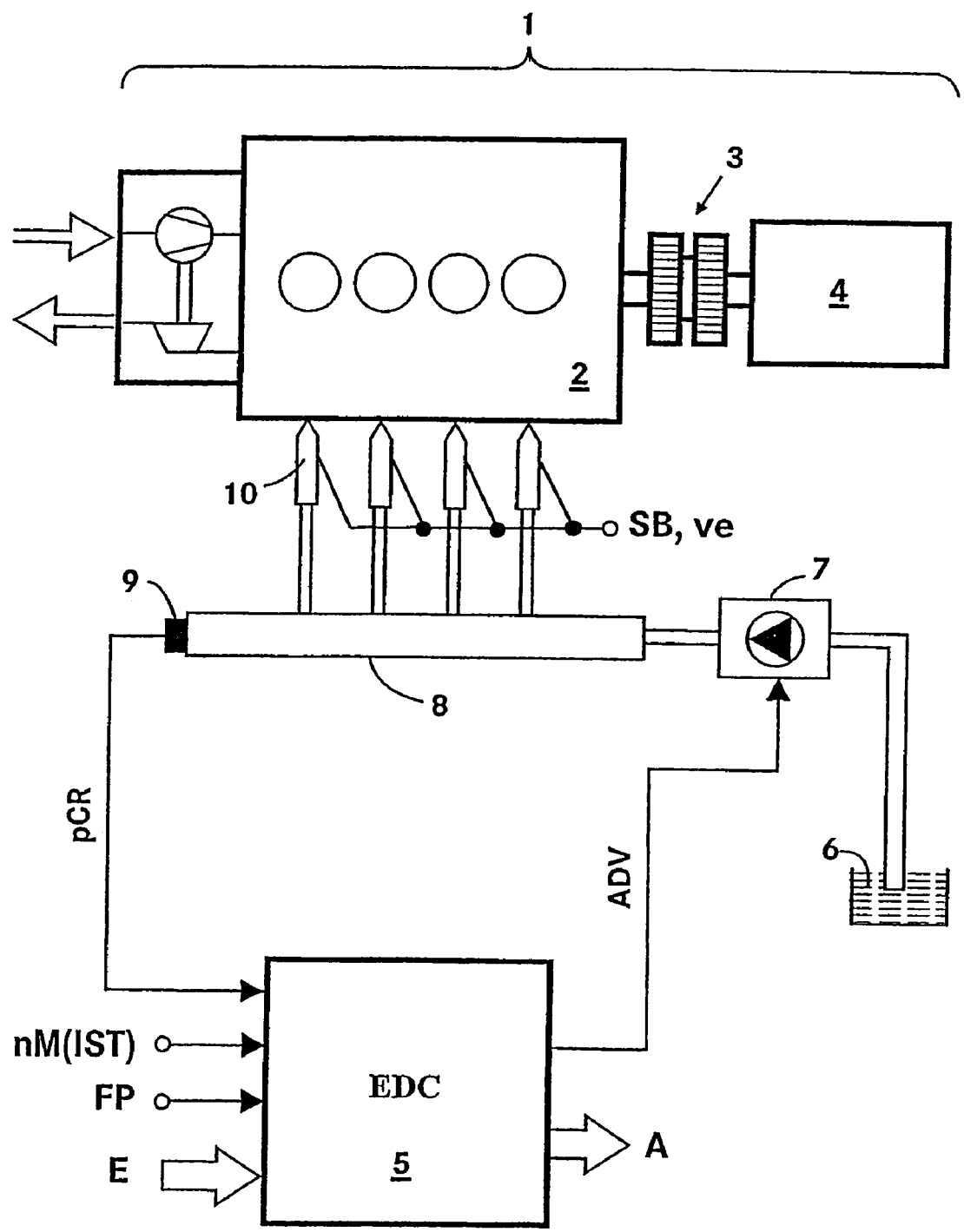
FIG. 1 shows a system diagram.

FIG. 1 shows a system diagram of the overall system of a drive unit 1, for example, an internal combustion engine-generator unit. It comprises an internal combustion engine 2 with an engine load 4. The internal combustion engine 2 drives the engine load 4 via a shaft with a transmission element 3. In the illustrated internal combustion engine 2, the fuel is injected by a common-rail injection system. This injection system comprises the following components: pumps 7 with a suction throttle for conveying the fuel from a fuel tank 6; a rail 8 for storing the fuel; and injectors 10 for injecting the fuel from the rail 8 into the combustion chambers of the internal combustion engine 2.

The internal combustion engine 2 is automatically controlled by the electronic control unit (EDC) 5. The electronic control unit 5 contains the usual components of a microcomputer system, for example, a microprocessor, interface adapters, buffers, and memory components (EEPROM, RAM). The relevant operating characteristics for the operation of the internal combustion engine 2 are applied in the memory components in input-output maps/characteristic curves. The electronic control unit 5 uses these to compute the output variables from the input variables. FIG. 1 shows the following input variables as examples: a rail pressure pCR, which is measured by means of a rail pressure sensor 9; an actual speed nM(IST) of the internal combustion engine 2; an input variable E; and a signal FP for the power presetting by the operator. In a motor vehicle application, this corresponds to the position of the accelerator pedal. Examples of input variables E are the charge air pressure of the turbochargers and the temperatures of the coolant/lubricant and the fuel.

As output variables of the electronic control unit 5, FIG. 1 shows a signal ADV for controlling the pumps 7 with a suction throttle and an output variable A. The output variable A is representative of the other control signals for automatically controlling the internal combustion engine 2, for example, the injection start SB and a power-determining signal ve, which corresponds to the injection quantity.

Figure 2:
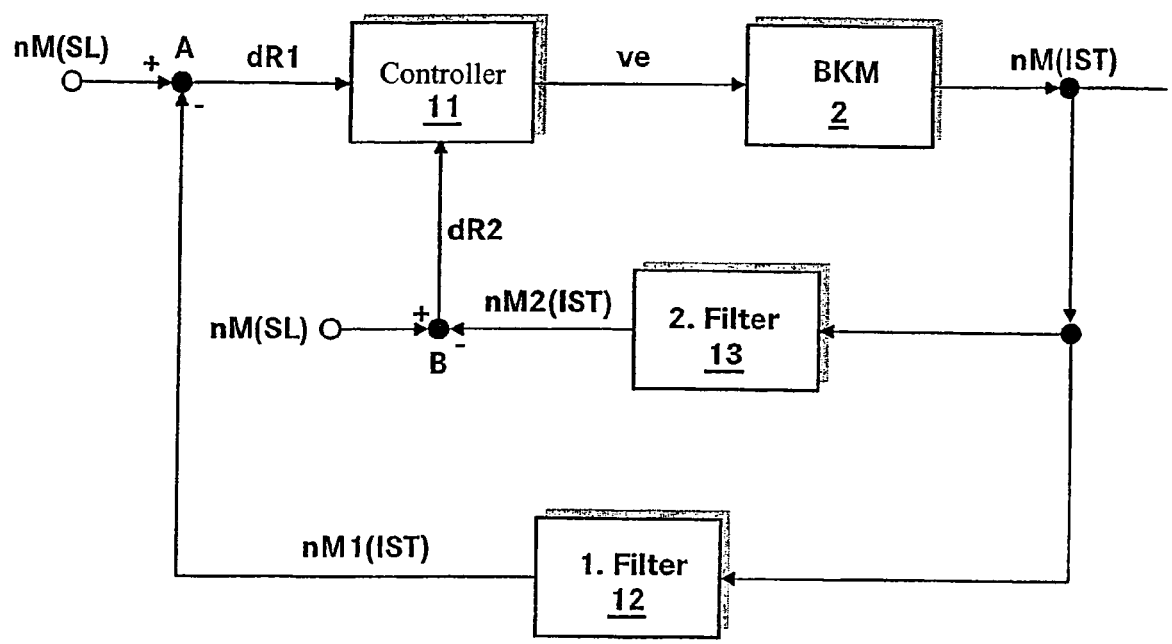
FIG. 2 shows a closed-loop speed control system.

FIG. 2 shows a functional block diagram of the closed-loop speed control system. The input variable of the closed-loop speed control system is a set speed nM(SL). The output variable of the closed-loop speed control system is the unfiltered actual speed nM(IST). A first filter 12 for computing the first actual speed nM1(IST) from the current unfiltered actual speed nM(IST) is provided in a first feedback path. The first filter 12 is usually designed as a two-revolution filter, i.e., it averages the actual speed NM(IST) over one operating cycle corresponding to 720° of the crankshaft. A second filter 13 for computing a second actual speed nM2(IST) from the current unfiltered actual speed nM(IST) is provided in a second feedback path. The second filter 13 is realized, e.g., as a mean value filter with a filter angle of a 90° crankshaft angle. The second filter 13 thus has significantly greater dynamics than the first filter 12.

A first control deviation dR1 is computed at a first comparison point A. It is determined from the set speed nM(SL) and the first actual speed nM1(IST). The first control deviation dR1 is the input variable of the speed controller 11. A second control deviation dR2 is computed at a second comparison point B. It is determined from the set speed nM(SL) and the second actual speed nM2(IST). The second control deviation dR2 is also supplied to the speed controller 11. The internal structure of the speed controller 11 will be explained in connection with the description of FIGS. 3 and 5. The speed controller 11 determines a correcting variable from the input variables. In FIG. 2, this correcting variable is designated as a power-determining signal ve. The power-determining signal ve represents the input variable for the controlled system, which in the present case is the internal combustion engine 2. The output variable of the controlled system corresponds to the unfiltered actual speed nM(IST). The automatic control system is thus closed.

The invention is designed in such a way that during steady-state operation of the drive unit, the speed controller 11 computes the power-determining signal ve exclusively as a function of the first control deviation dR1. When a dynamic change of state occurs, the speed controller 11 determines the power-determining signal ve as a function of the first control deviation dR1 and the second control deviation dR2.

Figure 3:
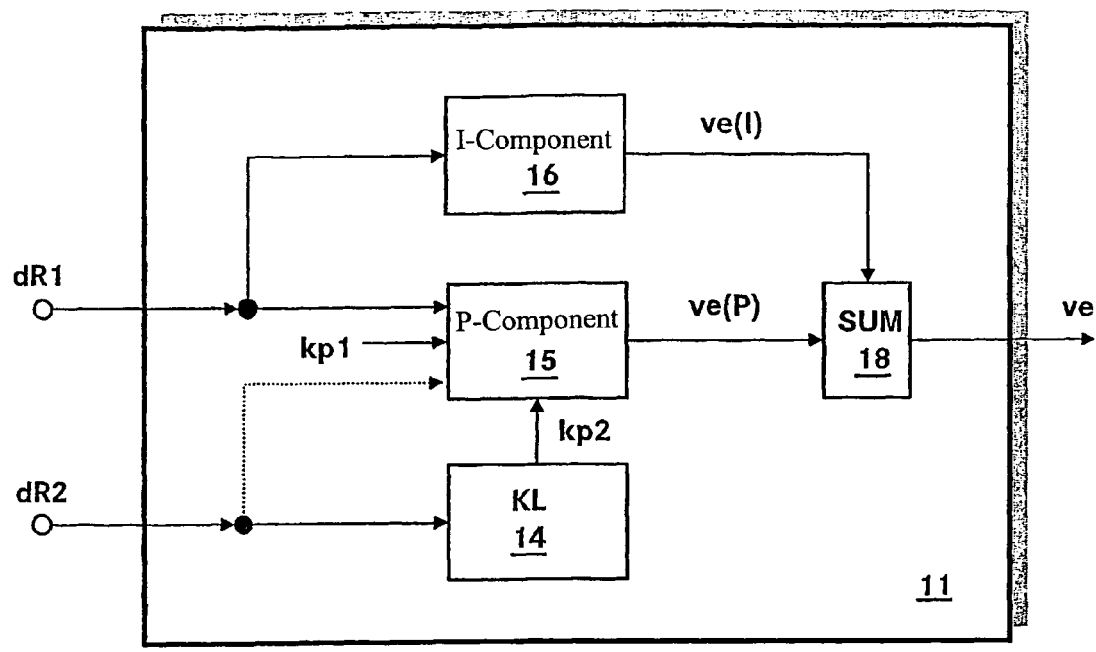
FIG. 3 shows a functional block diagram of the speed controller.
Figure 4:
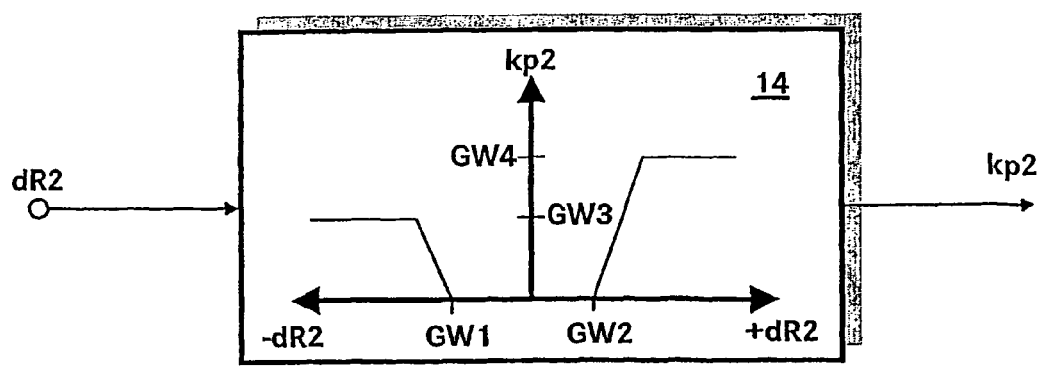
FIG. 4 shows a characteristic curve.

FIG. 3 shows a functional block diagram that represents a first embodiment of the internal structure of the speed controller 11. The speed controller 11 comprises a proportional component (P component) 15 for determining a proportional component ve(P) of the power-determining signal ve, an integral-action component (I component) 16 for determining an integral-action component ve(I) of the power-determining signal ve, a characteristic curve 14, and a summation unit 18. The first control deviation dR1 is the input variable for the P component 15 and the I component 16. The second control deviation dR2 is supplied to the characteristic curve 14. The output variable of the characteristic curve 14 is a factor kp2, which acts on the P component 15. Another input variable of the P component 15 is a factor kp1. The characteristic curve is shown in FIG. 4. Values of the second control deviation dR2 are plotted in the positive/negative direction on the x-axis. The y-axis represents the factor kp2. A first limiting value GW1 and a second limiting value GW2 are plotted on the x-axis. At very large negative values of the second control deviation dR2, the factor kp2 is limited to a value GW3. A negative control deviation is present when the second actual speed nM2(IST) is greater than the set speed nM(SL). At positive second control deviations dR2 that are greater than the second limiting value GW2, the factor kp2 is limited to the value GW4. In the region between the first limiting value GW1 and the second limiting value GW2, the factor kp2 is set to the value zero. It is apparent from the characteristic curve 14 that in the steady state, i.e., where the second control deviation dR2 is almost zero, the factor kp2 has a value of zero. Consequently, the P component 15 of the speed controller 11 is determined in this case exclusively from the first control deviation dR1. In the event of dynamic changes of state, i.e., where there is a large negative or positive second control deviation dR2, the factor kp2 acts on the P component 15 of the speed controller 11. The P component of the power-determining signal is now computed as a function of the first control deviation dR1 and the factors kp1 and kp2:

$$ve(P)=dR1 \cdot (kp1+kp2)$$

where
ve(P)=proportional component of the power-determining signal ve
dR1=first control deviation
kp1=first factor
kp2=second factor The factor kp1 can either be preset as a constant or computed as a function of the first actual speed nM1(IST) and/or the I component ve(I).

Another possibility for computing the P component ve(P) is to use the control deviation dR2 directly for the computation of the P component 15:

$$ve(P)=dR1 \cdot kp1+dR2 \cdot kp2$$

where
ve(P)=proportional component of the power-determining signal ve
dR1=first control deviation
dR2=second control deviation
kp1=first factor
kp2=second factor This embodiment is shown by the dotted line in FIG. 3. The P component and the I component are added in the summation unit 18. The sum corresponds to the power-determining signal ve.

Figure 5:
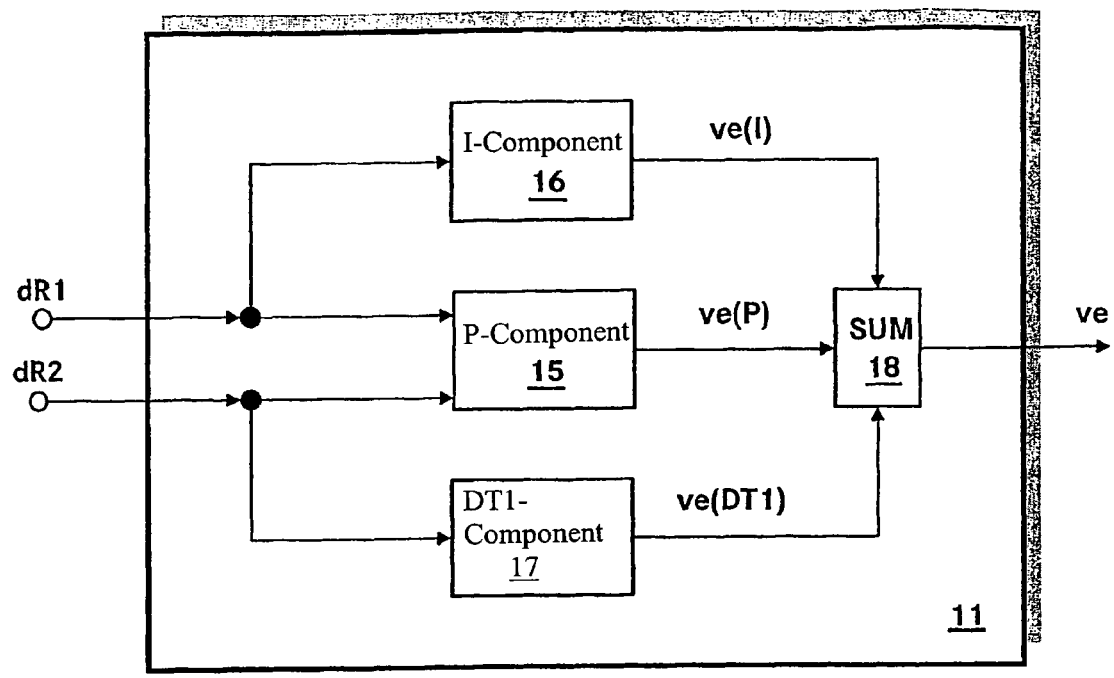
FIG. 5 shows a functional block diagram of the speed controller (second embodiment)
Figure 6:
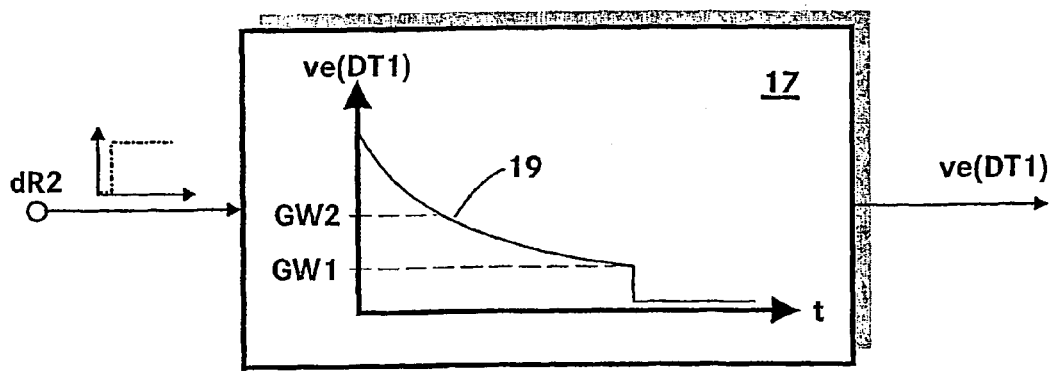
FIG. 6 shows a characteristic curve.

FIG. 5 shows a functional block diagram of a second embodiment of the internal structure of the speed controller 11. In this embodiment, in contrast to the embodiment shown in FIG. 3, the second control deviation dR2 is supplied to the P component 15 and simultaneously to a DT1 component 17. The DT1 component 17 computes the DT1 component ve(DT1) of the power-determining signal ve. The summation unit 18 then computes the power-determining signal ve from the addends of the P component, I component, and DT1 component. The DT1 component 17 is computed by a characteristic curve 19, which is shown in FIG. 6. The time t is plotted on the x-axis. The y-axis corresponds to the DT1 component ve(DT1) of the power-determining signal ve. When there is a sudden change in the second control deviation dR2, it is assigned a corresponding value ve(DT1) by the characteristic curve 19. Two limiting values GW1 and GW2 are plotted on the graph. The DT1 component is deactivated if the second control deviation dR2 becomes smaller than the first limiting value GW1, i.e., the signal ve(DT1) then has a value of zero. The DT1 component is activated if the second control deviation dR2 becomes greater than the second limiting value GW2. The effect of the limiting value GW2 is that, when there are dynamic changes of state, i.e., when the second control deviation dR2 has large positive or negative values, the DT1 component is also incorporated in the computation of the power-determining signal ve. When a steady state exists, i.e., where the second control deviation dR2 is practically zero, the power-determining signal ve is determined exclusively from the P component and the I component.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for closed-loop speed control of an internal combustion engine, comprising the steps of: computing a first filtered actual speed (nM1(IST)) from an actual speed (nM(IST)) of the internal combustion engine by means of a first filter; computing a first control deviation (dR1) from a set speed (nM(SL)) of the internal combustion engine and the first filtered actual speed (nM1(IST)); determining a power-determining signal (ve) for automatically controlling the speed of the internal combustion engine from the first control deviation (dR1) by means of a speed controller; computing a second filtered actual speed (nM2(IST)) from the actual speed (nM(IST)) of the internal combustion engine by means of a second filter; computing a second control deviation (dR2) from the set speed (nM(SL)) and the second filtered actual speed (nM2(IST)); and, when a dynamic change of state occurs, determining the power-determining signal (ve) for the closed-loop speed control of the internal combustion engine with the speed controller from the first control deviation (dR1) and the second control deviation (dR2).

2. The method for the closed-loop speed control of an internal combustion engine in accordance with claim 1, wherein the second filter has a smaller filter angle than the first filter.

3. The method for the closed-loop speed control of an internal combustion engine in accordance with claim 1, including detecting the dynamic change in state by way of the second control deviation (dR2).

4. The method for the closed-loop speed control of an internal combustion engine in accordance with claim 3, wherein the second control deviation (dR2) acts on a DT1 component of the speed controller.

5. The method for the closed-loop speed control of an internal combustion engine in accordance with claim 4, including determining the DT1 component from the second control deviation (dR2) by way of a characteristic curve.

6. The method for the closed-loop speed control of an internal combustion engine in accordance with claim 5, including deactivating the DT1 component by means of the characteristic curve if the second control deviation (dR2) becomes smaller than a first limiting value (GW1) (dR2<GW1), and activating the DT1 component by means of the characteristic curve if the second control deviation (dR2) becomes greater than a second limiting value (GW2) (dR2>GW2).

7. The method for the closed-loop speed control of an internal combustion engine in accordance with claim 3, wherein the second control deviation (dR2) acts on a P component of the speed controller.

8. The method for the closed-loop speed control of an internal combustion engine in accordance with claim 7, including determining the P component from the first control deviation (dR1), a first factor (kp1), and a second factor (kp2), with the second factor (kp2) being computed from the second control deviation (dR2) by way of a characteristic curve.

9. The method for the closed-loop speed control of an internal combustion engine in accordance with claim 8, including additionally computing the P component from the second control deviation (dR2).

10. The method for the closed-loop speed control of an internal combustion engine in accordance with claim 8, wherein the first factor (kp1) is either preset as a constant or computed as a function of the first filtered speed (nM1(IST)) and/or an I component (ve(I)).

* * * * *